April 1, 1969  A. O. DENTZ  3,436,726

HOOD ACTUATED WARNING DEVICE FOR MOTOR VEHICLES

Filed March 21, 1966  Sheet 1 of 2

INVENTOR
ALBERT O. DENTZ

BY *Hauke, Kruse, & Gifford*

ATTORNEYS

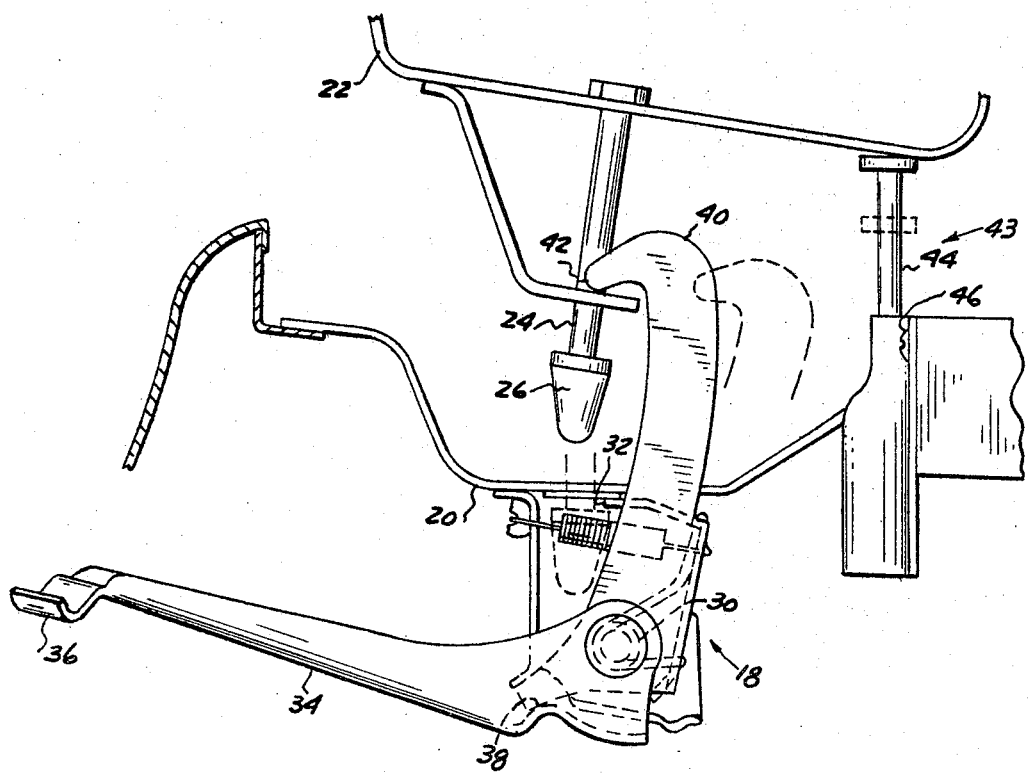
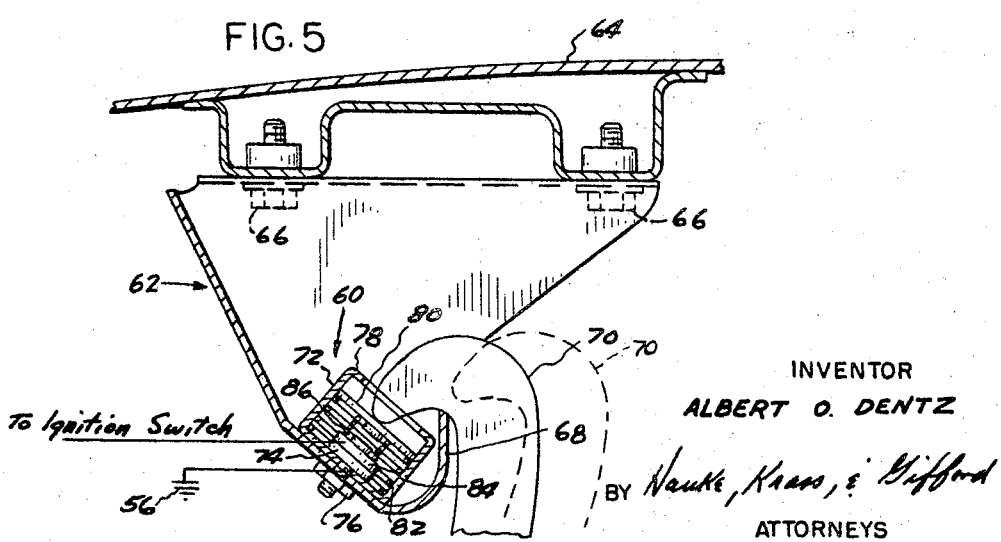

3,436,726
HOOD ACTUATED WARNING DEVICE
FOR MOTOR VEHICLES
Albert O. Dentz, 19180 Appleton,
Detroit, Mich. 48219
Filed Mar. 21, 1966, Ser. No. 535,749
Int. Cl. B60q 9/00
U.S. Cl. 340—52       4 Claims

ABSTRACT OF THE DISCLOSURE

A warning device for indicating to the operator of a vehicle that the hood of the vehicle is not in its fully closed position at such times as the vehicle is being operated.

---

The present invention relates to automotive safety devices and more specifically to an automatic warning device adapted to be energized when the hood of an automotive type vehicle is not securely locked in place and the operator of the vehicle energizes the ignition system of the vehicle.

Conventional hood locking mechanisms include a primary latch and a secondary latch. Normally the primary latch mechanism comprises a headed locking stud which projects downwardly from a bracket which is carried by the hood, and is adapted to enter a socket opening in a plate supported by the chassis intermediate the grille and the radiator, when the hood is lowered. The socket structure includes a spring loaded, shaped latch which is biased to a position overlapping the socket opening and over the head of the stud in such a position that it precludes withdrawal of the stud from the socket and locks the hood against opening.

The secondary or safety latch engages the hood when the primary latch is released and the hood is partially raised. The secondary latch must itself be released to permit the hood to be fully opened. The purpose of this secondary or safety latch is to prevent the hood from raising under wind pressure when the car is moving in case the hood is accidentally not fully closed with the primary latch in the locked condition.

Normally a movably mounted lever arm is operatively associated with the primary anr secondary latches so that the operator of the vehicle can move the primary and secondary latches concurrently into and out of the hood engaging position.

Previous efforts have been made to provide signaling devices intended for safe operation of automotive vehicles. For instance, the "Door-Controlled Signaling Device for Automotive Vehicles," Patent No. 2,761,121, issued to Mario Caporale, Aug. 28, 1956, wherein an automatic signaling device responsive to the opening of a car door energizes an optical or acoustical signaling means to warn the driver that the safety lock of the door is not properly engaged. However, in recent years the automotive industry has recognized that the safety features that have been available in the past art have not been sufficient. It is therefore, the primary purpose of the present invention to increase the safety devices available for automobiles and which takes the form of a warning or signaling device responsive to disengagement of the hood out of its locked position.

The preferred warning device includes a switch mechanism movable into and out of a circuit closing condition and actuated by a predetermined displacement of the hood, an alarm circuit including the ignition switch of the automobile connected in series with the hood actuated switch and an indicator preferrably of a visual type mounted on the dashboard of the vehicle and energized by the concurrent actuation of both switches.

The hood actuated switch is adapted to energize the alarm circuit when the hood is displaced sufficiently from its extreme lowered position so that it is not locked by the primary latch, but before it has been raised beyond the safety latch engaging position.

In a vehicle having a conventional hood locking mechanism, the hood actuated switch takes the form of a plunger type switch mounted adjacent the primary latch catch assembly. The plunger switch has a member mounted for reciprocating vertical movement between an extended position when the hood is in a raised position wherein the switch contacts are in a circuit actuating condition, and a retracted position when the hood is in an extreme lowered position such that the switch contacts are in a nonactuating condition.

An alternative form of hood actuated switch is mounted on the under side of the hood and is associated with the secondary or safety latch catch bracket. Conventionally the safety latch is mounted on the primary latch catch assembly between the grille and the radiator and includes a hook-shaped element that projects upwardly to engage a hood mounted bracket. The safety latch hook is movable in a vertical plane and lies in the path of movement of the bracket. As the hood moves upwardly from its extreme lowered position the bracket moves into engagement with the hook such that the curved end of the hook catches a lip formed in the bracket.

Fixed to the preferred bracket and adjacent the hook engaging lip is a switch adapted to be actuated by the end of the latch moving into active engagement with the bracket lip. Thus, in this form of the invention, the alarm circuit is actuated when the hood is displaced from its extreme lowered position and is engaged with the safety latch.

The present invention represents an improvemnt over the prior art including hood actuated alarms as characterized by Patent No. 2,693,588, issued to John G. Dawley, Nov. 2, 1954 in that the preferred warning safety signal is adapted to be operable in combination with a particular condition of the locking mechanism. Thus if the hood is partially disengaged, the alarm circuit is actuated, but if the hood is totally raised, the alarm is not energized in the latter form of the invention since the operator can obviously see that the hood is not in the locked position. Furthermore whereas the Dawley disclosure teaches an alarm switch operable from a key operated or master switch, preferably accessible from the exterior of the vehicle and separate from the ignition switch, the present invention is actuated when the hood safety switch and the ignition switch are energized concurrently.

It is therefore a primary object of the present invention to provide an alarm device for automotive type vehicles actuated by disengagement of the hood with the locking mechanism and including signaling means preferably mounted on the dashboard of the automobile to indicate to the operator of the vehicle the unsafe hood condition.

It is a further object of the present invention to provide an effective hood actuated warning device which may be readily incorporated in conventional automotive vehicles.

It is still a further object of the present invention to provide a warning device responsive to engagement of the hood with the safety latch of the vehicle and said warning device effective to warn the operator that the hood is not locked in the normally closed position.

Other objects advantages and applications of the present invention will be made apparent upon reference to the following detailed description of a preferred embodiment of the invention. The description makes reference to the accompanying drawings in which:

FIGURE 2 is an enlarged view of the hood locking mechanism and the signaling switch illustrated in FIGURE 1;

FIGURE 5 illustrates an alternative form of hood switch fixed to the safety latch catch.

Figure 1:
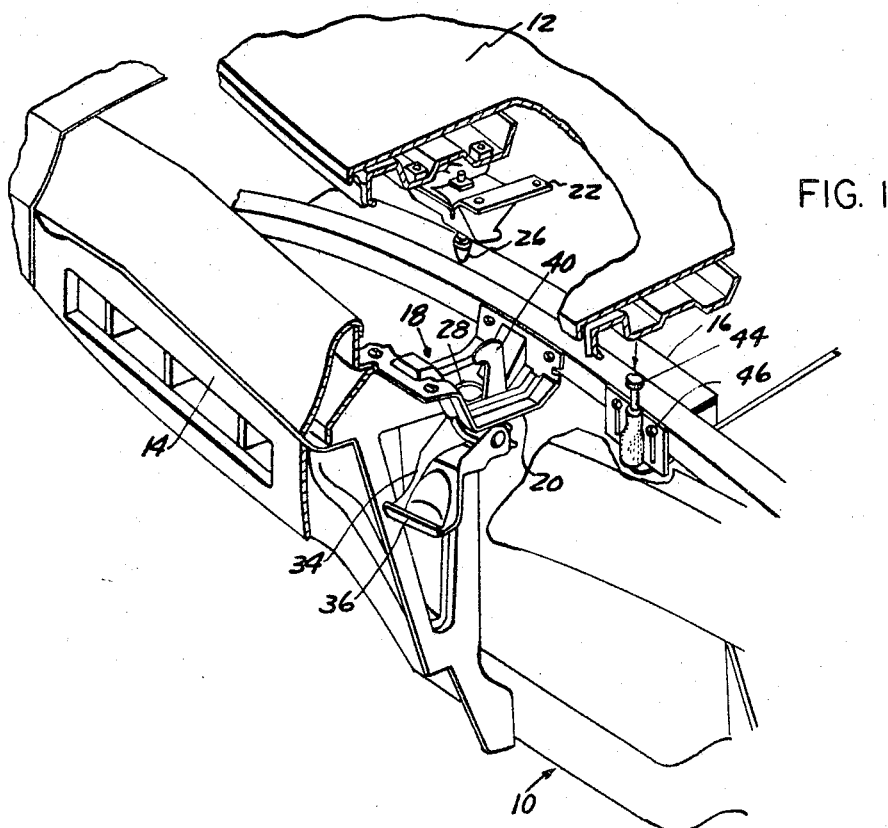
FIGURE 1 is a fragmentary perspective view of the front section of a typical automotive vehicle having a preferred embodiment of the signaling switch mounted adjacent the hood locking mechanism.

Now referring to the drawings and in particular FIGURE 1, a conventional automobile is indicated at 10, and includes pivotally raisable hood 12 which normally forms part of the enclosure of the engine compartment, a grille 14 and a radiator 16, and a hood latch socket structure 18 supported on a bracket 20 in front of the radiator 16 and inside the grille 14. The hood 12 has a bracket 22 which carries a downward projecting stud 24 having an enlarged end 26. The bracket 20 has a socket opening 28 disposed to receive the enlarged end 26 as the hood is lowered into its extreme position.

The bracket 20 has a horizontal pin 30 which is disposed behind and offset from the opening 28. A spring loaded primary latch 32 is pivotably supported on the pin 30 is is biased toward the opening 28. As the hood 12 is lowered, the stud end 26 passes through the socket opening 28 until the shaped edge of the primary latch 32 engages the stud 24 above the enlarged end 26. The hood 12 is then locked in its lowered position.

The pin 30 carries a lever 34 having a handle end 36 which is normally accessible by the operator adjacent the grille 14. Normally, the lever 34 is pivotally mounted such that a projection 38 carried thereon can be pivoted into engagement with the primary latch 32 pivoting it out of engagement with the stud 24.

A secondary lever or latch 40 mounted on the pin 30 extends rearwardly of the bracket 20 and projects angularly upward. Latch 40 includes a hooked-shaped end 42 which extends forwardly and normally is disposed over and above the hood bracket 22 when the hood is engaged by the primary latch 32. If the primary latch 32 is accidentally disengaged, or if it should break such that the hood is not positively locked in the extreme lowered position, then the hood will tend to rise so that the bracket 22 will engage the secondary or safety latch 40 such that further upward movement is restrained.

The operator can move the primary latch 32 and the safety latch 40 rearwardly out of locking position by pulling the lever handle 36 forwardly.

Although the secondary latch 40 provides a safety feature such that the hood 12 will not fully rise due to wind pressure if the primary latch 32 is disengaged, normally the secondary latch does not allow the hood 12 to rise sufficiently so that the operator of the vehicle is aware that the hood is not positively locked in the the lowered position thus creating a potentially dangerous situation. Therefore, a switch 43 is mounted to the chassis or the grille 14 adjacent the socket structure 18 by suitable means such as threaded members 46. The switch 43 has a plunger actuator 44 movable between an extended position and a retracted position.

Preferably the plunger switch 44 is of the spring loaded type having a circuit closing condition when in the extended position and a circuit breaking condition in the retracted position. When the hood 12 is locked by primary latch 32, it will urge the plunger 44 into the retracted position, however if the hood is raised sufficiently that it is not locked, the plunger 44 is extended into a circuit closing condition so that it actuates an alarm circuit generally indicated at 48 (FIG. 3).

Figure 4:
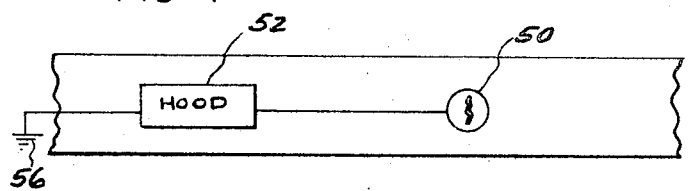
FIGURE 4 illustrates a form of visual indicator mounted on the dashboard of a motor vehicle.
Figure 3:
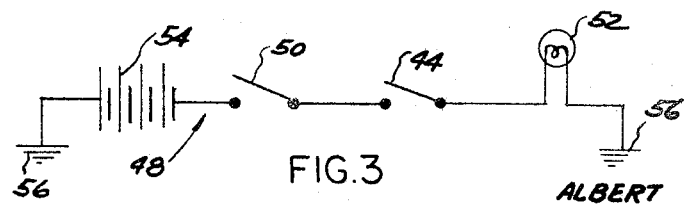
FIGURE 3 is a wiring diagram illustrating a preferred alarm circuit.

Now referring to FIGURES 3 and 4, the alarm circuit 48 includes the ignition switch 50, a warning light 52 mounted preferably on the dash board (not shown) and a source of electrical power such as battery 54 which is grounded at 56 in the customary manner.

It can be seen that the alarm circuit 48 will be energized so that the battery 54 will supply current to the warning light 52 when the plunger switch 43 and the ignition switch 50 are concurrently closed. That is to say that the two switches are connected in series.

It is to be understood that although in the description we have shown warning light 52, a thermoswitch to provide a flashing light or a buzzer to provide an acoustical warning or a combination of a light and a buzzer could alternatively be provided. It is to be further understood that the preferred warning light 52 could be incorporated as a standard light on the dashboard of new vehicles or it could be mounted as a separate independently mounted light on existing vehicles.

Now referring to FIGURE 5, an alternative form of the invention comprises a switch assembly generally indicated at 60 fixed to a safety latch bracket 62 on the underside of a hood 64 by threaded fasteners 66. The bracket 62 has an upturned lip or flange portion 68 formed to engage a hook-shaped safety latch 70 of the type heretofore described when the hood 64 rises from its lower locked position.

The switch 60 includes an open ended cylindrical housing 72 fixed to the bracket 62 by threaded contact member 74 and nut 76. Preferably housing 72 and bracket 62 are formed of a non-electrical conducting material such as a rigid plastic or vinyl.

Housing 72 has an inturned peripheral lip portion 78 formed at its open end. A disk member 80 having a circumferential edge complementarily shaped to the inner surface of housing 72 is slidably disposed therein. A spring 82 is seated in the housing 72 and urges the disk 80 against the lip portion 78.

A movable contact element 84 is connected to the inner surface of disk 80 by a spring 86. Springs 82 and 86 are chosen of lengths sufficient that the disk is normally abutting lip 78 and the movable contact 84 is spaced from the contact 74. Both contacts form part of an alarm circuit as illustrated in FIGURE 3 and close in circuit closing relationship when latch 70 engages flange 68 such that the tip of latch 70 forces disk 80 inwardly in housing 72 to move contact 84 against contact 74.

Thus it will be seen that in this embodiment of the invention that the alarm circuit is energized only when the hood 64 is displaced from the lower locked position and has risen into engagement with the safety latch 70. The alarm circuit is not energized when the hood 64 has completely risen since when in this position, the operator of the vehicle can readily see the condition of the hood without the assistance of an alarm device.

I claim:

1. In an automotive vehicle having an ignition circuit connected to a source of electrical energy and including an ignition switch movable between open and closed positions; a hood supported for movement with respect to an engine compartment between a fully closed position and a fully open position; a first latch supported for movement between a first position in which it is operable to lock the hood against movement from its fully closed position toward its fully opened position, and a second position in which it is inoperable to lock the hood against movement from its fully closed position; a bracket mounted on the hood, a safety latch supported for movement between a first position in which it is engageable with the bracket when the hood is in a partially open position and is operable when engaged with the bracket to prevent the hood from being moved from its partially open position towards its fully open position, and a second position in which it is inoperable to prevent movement of the hood towards its fully open position; the combination comprising:

(a) an electrically actuated warning means connected in said ignition circuit, said warning means being operable upon being energized to provide a warning signal; and (b) a switch engageable with the safety latch including a movable contact connected to said ignition circuit, said switch being mounted on said bracket such that the contact is moved by the safety latch as the latch is engaged with the bracket toward a first position in which the contact is operable to place the ignition circuit in condition to energize the warning means at such times as the ignition switch is in one of its positions, from a second position in which the contact is inoperable to cause the warning means to be energized, said switch further including bias means for urging the contact towards its second position so that the warning means can be energized only if the safety latch is engaged with the bracket.

2. A combination as defined in claim 1, wherein said warning means includes an optical signaling means effective to indicate to the user of said automotive vehicle that said hood is engaged by said second latch.

3. A combination as defined in claim 1, in which the warning means comprises a warning light which is illuminated when electrically energized.

4. A combination as defined in claim 1, in which the switch includes: a housing fixedly but removably attached to the bracket, said housing having an opening for receiving a portion of the safety latch; a disk member supported in said housing adjacent said opening so as to contact the safety latch as it is engaged with the bracket; a fixed contact in said housing connected to said circuit; and the movable contact is connected to said disk so as to be moved with the disk toward the fixed contact as the disk is moved by the safety latch.

References Cited

UNITED STATES PATENTS 2,576,017  11/1951  Jeffrey et al. _____ 340—63 XR

ALVIN H. WARING, *Primary Examiner.*

U.S. Cl. X.R.

340—64, 274, 282; 180—82